United States Patent
Towfiq et al.

(10) Patent No.: US 9,357,062 B2
(45) Date of Patent: May 31, 2016

(54) MESSAGE ROUTING USING LOCATION ROUTING NUMBERS

(71) Applicant: Flowroute Inc., Seattle, WA (US)

(72) Inventors: Bayan W. Towfiq, Seattle, WA (US); MohammedAli Merchant, Seattle, WA (US)

(73) Assignee: Flowroute Inc., Seattle, WA (US)

(*) Notice: Subject to any disclaimer, the term of this patent is extended or adjusted under 35 U.S.C. 154(b) by 0 days.

(21) Appl. No.: 14/798,376

(22) Filed: Jul. 13, 2015

(65) Prior Publication Data

US 2016/0127546 A1    May 5, 2016

Related U.S. Application Data

(60) Provisional application No. 62/073,007, filed on Oct. 30, 2014.

(51) Int. Cl.
*H04M 3/42* (2006.01)
*H04M 7/12* (2006.01)
*H04M 7/00* (2006.01)

(52) U.S. Cl.
CPC ...... *H04M 3/42297* (2013.01); *H04M 3/42348* (2013.01); *H04M 7/0042* (2013.01); *H04M 7/0051* (2013.01); *H04M 7/128* (2013.01)

(58) Field of Classification Search
None
See application file for complete search history.

(56) References Cited

U.S. PATENT DOCUMENTS

| | | | |
|---|---|---|---|
| 6,169,793 B1 * | 1/2001 | Godwin | H04M 3/42229 379/221.09 |
| 6,192,242 B1 * | 2/2001 | Rollender | H04Q 3/005 455/416 |
| 6,434,144 B1 | 8/2002 | Romanov | |
| 6,438,219 B1 | 8/2002 | Karau et al. | |
| 6,473,502 B1 | 10/2002 | Karau et al. | |
| 6,473,503 B1 | 10/2002 | Karau et al. | |
| 6,542,598 B2 | 4/2003 | Fleischer, III et al. | |
| 6,639,978 B2 | 10/2003 | Draizin et al. | |
| 6,836,477 B1 | 12/2004 | West, Jr. et al. | |
| 7,042,999 B2 | 5/2006 | Goldstein et al. | |
| 7,477,734 B1 | 1/2009 | Smith | |
| 7,542,559 B1 | 6/2009 | Donnachaidh et al. | |

(Continued)

OTHER PUBLICATIONS

Screenshot of Catalog of Products webpage of iconectiv. Taken Jan. 22, 2015 http://www.trainfo.com/products_services/tra/catalog_details.html 11 Pages.
Screenshot of main page of Number Portability Administration Center website. Taken Jan. 22, 2015 https://www.npac.com/ 1 Page.

(Continued)

*Primary Examiner* — Kodzovi Acolatse
(74) *Attorney, Agent, or Firm* — Perkins Coie LLP

(57) ABSTRACT

Various embodiments provide for a way of routing messages using location routing numbers. More specifically, some embodiments can route calls on different legacy networks by using features of existing telecommunication policy and databases. For example, a location routing number can be registered in a number portability administration center database. The location routing number may be in a native number block of a facility carrier and a company registering the location routing number in the number portability administration center database may not be the facility carrier. The destination switch of the facility carrier can be programmed to accept traffic associated with the location routing number. As a result, components of the network can route the message for the company to a destination switch of the facility carrier.

15 Claims, 11 Drawing Sheets

(56) References Cited

U.S. PATENT DOCUMENTS

| | | | |
|---|---|---|---|
| 7,573,997 | B2 | 8/2009 | Culli et al. |
| 7,620,163 | B2 | 11/2009 | Moisan et al. |
| 7,860,231 | B2 | 12/2010 | Florkey et al. |
| 7,995,736 | B2 | 8/2011 | Davis et al. |
| 8,031,856 | B2 | 10/2011 | Mikleton et al. |
| 8,761,371 | B2 | 6/2014 | Brown et al. |
| 8,775,674 | B2 | 7/2014 | Poulson et al. |
| 8,804,702 | B2 | 8/2014 | Meranchik |
| 8,842,817 | B2 | 9/2014 | Brown et al. |
| 2005/0068942 | A1 | 3/2005 | Chu et al. |
| 2005/0220287 | A1* | 10/2005 | Aures .............. H04Q 3/005 379/221.13 |
| 2007/0147358 | A1* | 6/2007 | Mikleton ............ H04M 7/128 370/356 |
| 2007/0258442 | A1 | 11/2007 | Mikleton et al. |
| 2008/0063177 | A1* | 3/2008 | Schultz .............. H04M 15/00 379/220.01 |
| 2008/0198999 | A1 | 8/2008 | Bantukul et al. |
| 2011/0182417 | A1* | 7/2011 | Malyar ............ H04M 3/42297 379/221.13 |
| 2013/0010946 | A1 | 1/2013 | Clark et al. |

OTHER PUBLICATIONS

Screenshot of Glossary page of Number Portability Administration Center website. Taken Jan. 22, 2015 https://www.npac.com/resources/public-knowledgebase/glossary 7 Pages.

Screenshot of How LNP Works page of Number Portability website. Taken Jan. 22, 2015 http://www.npac.com/number-portability/how-lnp-works 2 Pages.

Screenshot of What is LNP page of Number Portability Administration Center website. Taken Jan. 22, 2015 http://www.npac.com/number-portability/what-is-lnp 2 Pages.

Screenshot of Subscription Version Create Process Flowchart page Of Number Portability website. Taken Jan. 22, 2015 https://www.npac.com/lnpa-working-group/nanc-lnp-process-flows/subscription-version-create-process 4 Pages.

Screenshot of Local Number Portability page of Wikipedia. Taken Jan. 22, 2015 http://en.wikipedia.org/wiki/Local_number_portability 13 Pages.

Screenshot of Local Routing Number page of Wikipedia. Taken Jan. 22, 2015 http://en.wikipedia.org/wiki/Local_Routing_Number 2 Pages.

* cited by examiner

*FIG. 8*

MESSAGE ROUTING USING LOCATION ROUTING NUMBERS

CROSS-REFERENCE TO RELATED APPLICATIONS

This application claims priority to U.S. Provisional Application Ser. No. 62/073,007 filed Oct. 30, 2014, which is incorporated herein by reference for all purposes.

This application is also related to U.S. Non-Provisional application Ser. No. 14/798,292, entitled "Special Routing Service" filed concurrently herewith, and U.S. Non-Provisional application Ser. No. 14/798,397, entitled "Message Segmentation Using Location Routing Numbers" also filed concurrently herewith, and both of which are incorporated herein by reference for all purposes in their entirety.

BACKGROUND

Modern communications devices (such as mobile phones, telephones, computer tablets, or the like) have become an integral part of modern life. In order to route calls, these devices access communications networks owned by various operators. The operators of the communications networks can generally be classified as a public telephone operator or a virtual network operator. Public telephone operators own and build landline and wireless communication networks while a virtual network operator typically leases capacity from a public telephone operator.

Unfortunately, only some telecommunications companies have the facilities to access the legacy networks. As a result, this makes market entry difficult for companies without Public Switched Telephone Network (PSTN) facilities. In addition, there are a variety of regulations that restrict direct access to telephone numbers, telecom databases, etc., in particular for non-traditional carriers (e.g., voice over IP (VoIP)), which can be difficult to navigate. Companies that want to enter the market with direct control over their phone numbers have traditionally been required to invest in or lease facilities from public telephone operators for access to the network (e.g., need to lease lines from those who have the physical infrastructure).

BRIEF DESCRIPTION OF THE DRAWINGS

Embodiments of the present invention will be described and explained through the use of the accompanying drawings in which:

FIG. 8 is an example of a graphical user interface illustrating an entry in a routing database in accordance with various embodiments of the present invention;

Figure 1:
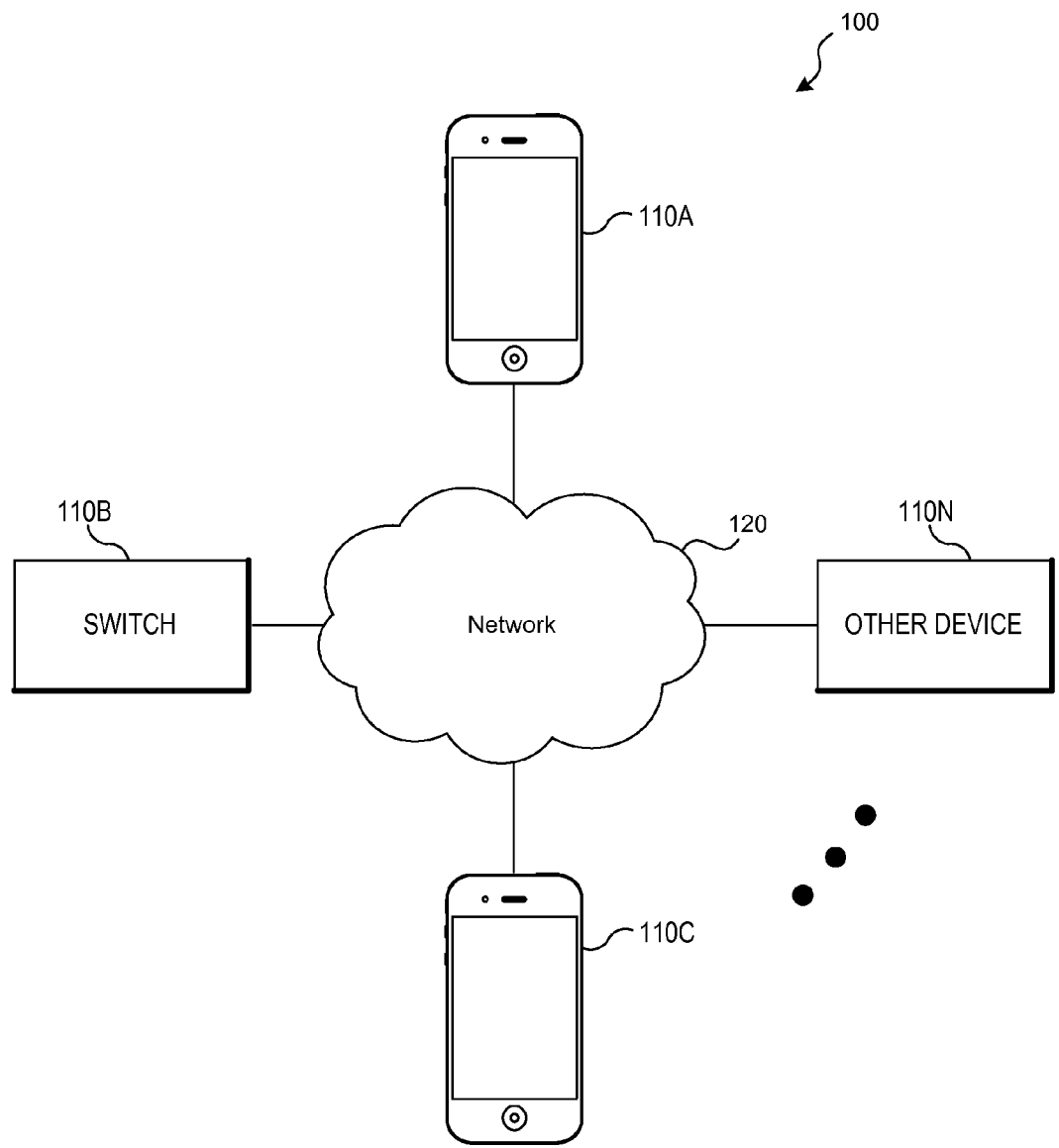
FIG. 1 illustrates an example of a communications environment in which some embodiments of the present invention may be utilized.

The drawings have not been drawn to scale. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Only a few telecommunication companies have the facilities to access the legacy networks. As a result, this makes market entry difficult for companies without PSTN facilities. In addition, there are a variety of regulations that restrict direct access to telephone numbers, telecom databases, etc. These regulations and restrictions, in particular for non-traditional carriers (e.g., VoIP), can be difficult to navigate. Companies that want to enter the market with direct control over their phone numbers have traditionally been required to invest in or lease facilities from public telephone operators for access to the network (e.g., need to lease lines from those who have the physical infrastructure).

In contrast, various embodiments provide for a creative way of accessing databases and existing hardware with a gateway that can route calls on different legacy networks by taking advantage of a new way to use existing IP policy and databases. Some embodiments utilize numbers in one or more of a carrier's native number block and an algorithm or database to switch a routing number and enter instead a desired phone number/routing location. Using these techniques, calls can be routed to underlying carriers (e.g., facilities carriers) without the need to lease facilities to access the network. For example, in some embodiments, a carrier may map incoming numbers to a different number so that the components of the network believe the call is originating from that carrier even though the call originated from another carrier without dedicated equipment.

In the following description, for the purposes of explanation, numerous specific details are set forth in order to provide a thorough understanding of embodiments of the present invention. It will be apparent, however, to one skilled in the art that embodiments of the present invention may be practiced without some of these specific details. While, for convenience, embodiments of the present invention are described with reference to circuit switched call routing, embodiments of the present invention are equally applicable to all packet switched networks (e.g., IP networks).

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present invention, and may be included in more than one implementation. In addition, such phrases do not necessarily refer to the same embodiments or different embodiments.

FIG. 1 illustrates an example of a communications environment 100 in which some embodiments of the present invention may be utilized. As illustrated in FIG. 1, communications environment 100 may include one or more devices 110A-110N (such as a mobile phone, landline telephone, set top box, tablet computer, mobile media device, mobile gaming device, wearable computer, vehicle-mounted computer, communications device, telephone switch, soft-switch, VoIP device, private branch exchange, endpoints, proxies, etc.) which can communicate using communications network 120.

To allow a user to make use of the various services and features of devices 110A-110N, some of the devices can include a display, a keypad, touchpad or touch screen, a microphone, applications, and/or a speaker. In addition, a call may originate and/or terminate at any of devices 110A-110N. For example, the call may originate from an end-user device and terminate at an end-user device. In other cases, a call may originate and terminate at various network components such as, but not limited to, telephone switches, soft-switches, VoIP devices, private branch exchanges, endpoints, proxies, and the like.

In addition, communication devices 110A-110N can include network communication components that enable the devices (e.g., mobile, wireline, VoIP, etc.) to communicate with remote servers, switches, gateways, or other network components by transmitting and receiving wireless signals using licensed, semi-licensed or unlicensed spectrum over communications network 120. In some cases, communication network 120 may be comprised of multiple networks, even multiple heterogeneous networks, such as one or more border networks, voice networks, broadband networks, service provider networks, Internet Service Provider (ISP) networks, and/or PSTNs, interconnected via gateways operable to facilitate communications between and among the various networks. Communications network 120 can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), or other communications network.

Those skilled in the art will appreciate that various other components (not shown) may be included in devices 110A-110N to enable network communication. For example, a communication device may be configured to communicate over a GSM mobile telecommunications network. As a result, the mobile device may include a Subscriber Identity Module (SIM) card that stores an International Mobile Subscriber Identity (IMSI) number that is used to identify the communication device on the GSM mobile communications network or other networks (e.g., those employing 3G and/or 4G wireless protocols). If the communication device is configured to communicate over another communications network, the communication device may include other components that enable it to be identified on the other communications networks. In some embodiments, devices 110A-110N include components that enable them to connect to a communications network using Generic Access Network (GAN) or Unlicensed Mobile Access (UMA) standards and protocols. For example, a communication device may include components that support Internet Protocol (IP)-based communication over a Wireless Local Area Network (WLAN) and components that enable communication with the telecommunications network over the IP-based WLAN.

Figure 2:
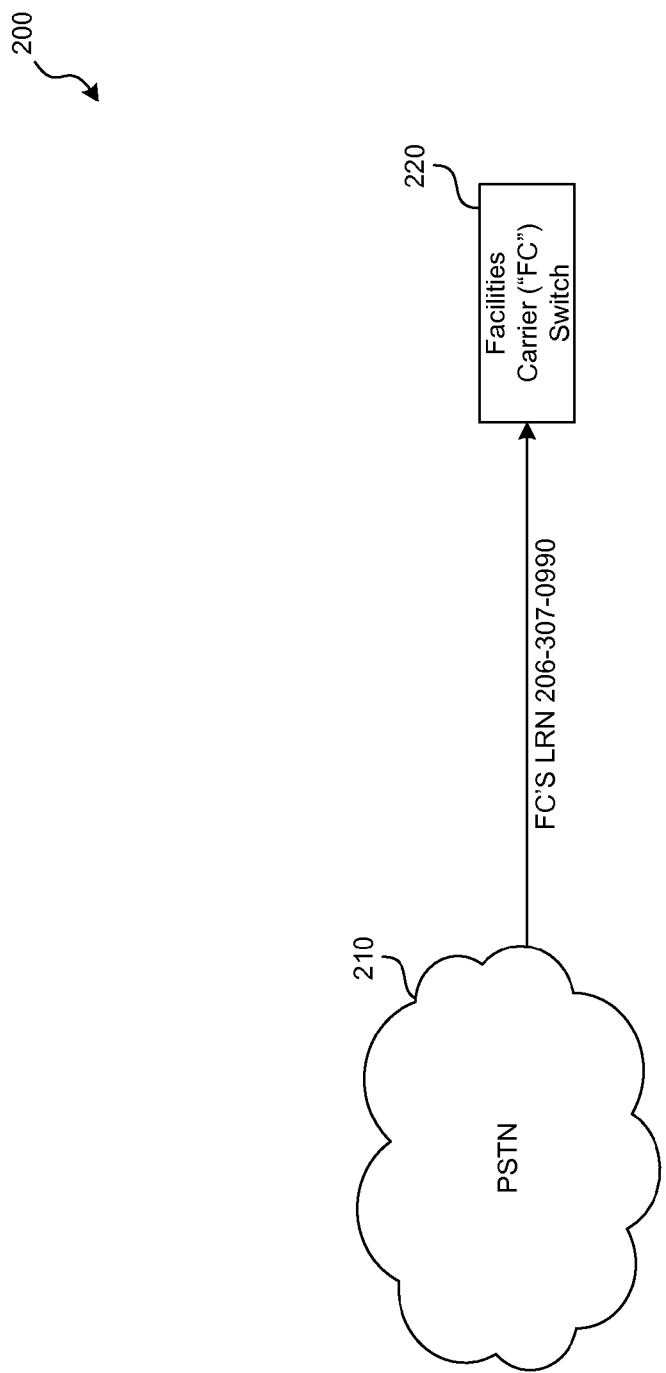
FIG. 2 illustrates an example of a partial call flow in accordance with various embodiments of the present invention.

FIG. 2 illustrates an example of a partial call flow in accordance with various embodiments of the present invention. As illustrated in FIG. 2, Public Switched Telephone Network ("PSTN") 210 has a physical or virtual connection with switch 220 of a facilities based carrier. PSTN 210 may include various IP elements, or be a fully or partially based IP network. Facilities carrier switch 220 has a location routing number (LRN) assigned. In some cases, switches may be assigned multiple LRNs. An LRN is a unique number assigned to a telephone switch through which ported telephone numbers can be routed.

Typically, an LRN uses the format of a ten-digit telephone number following the North American Numbering Plan (NANP) and is stored in a routing database (e.g., the Number Portability Administration Center Database). The full LRN or a subset of digits within the LRN can be used to route the call. For example, in some cases, the first six digits (i.e., the number plan area and the prefix (NPA-NXX)) of the LRN can be used to route the call with the last four digits representing a line number. The LRN generally can be used to map serving telephone numbers to a serving switch, however, and is not intended to convey any rate information. Rate information, for example, is typically stored in a separate database.

As illustrated in FIG. 2, the LRN assigned to facilities carrier switch 220 is 206-307-0990. The LRN is registered by facilities carrier and in a natively routed block of numbers (i.e., registered in the local exchange routing guide (LERG) database) to facilities carrier switch 220. A carrier other than the facilities carrier cannot route calls using the facilities carrier's LRN because of limitations imposed by the Number Portability Administration Center (NPAC). A carrier other than the facilities carrier could use a dedicated and/or leased circuit with its own natively routed block of numbers and their own LRN to route calls to facilities carrier's switch.

Figure 3:
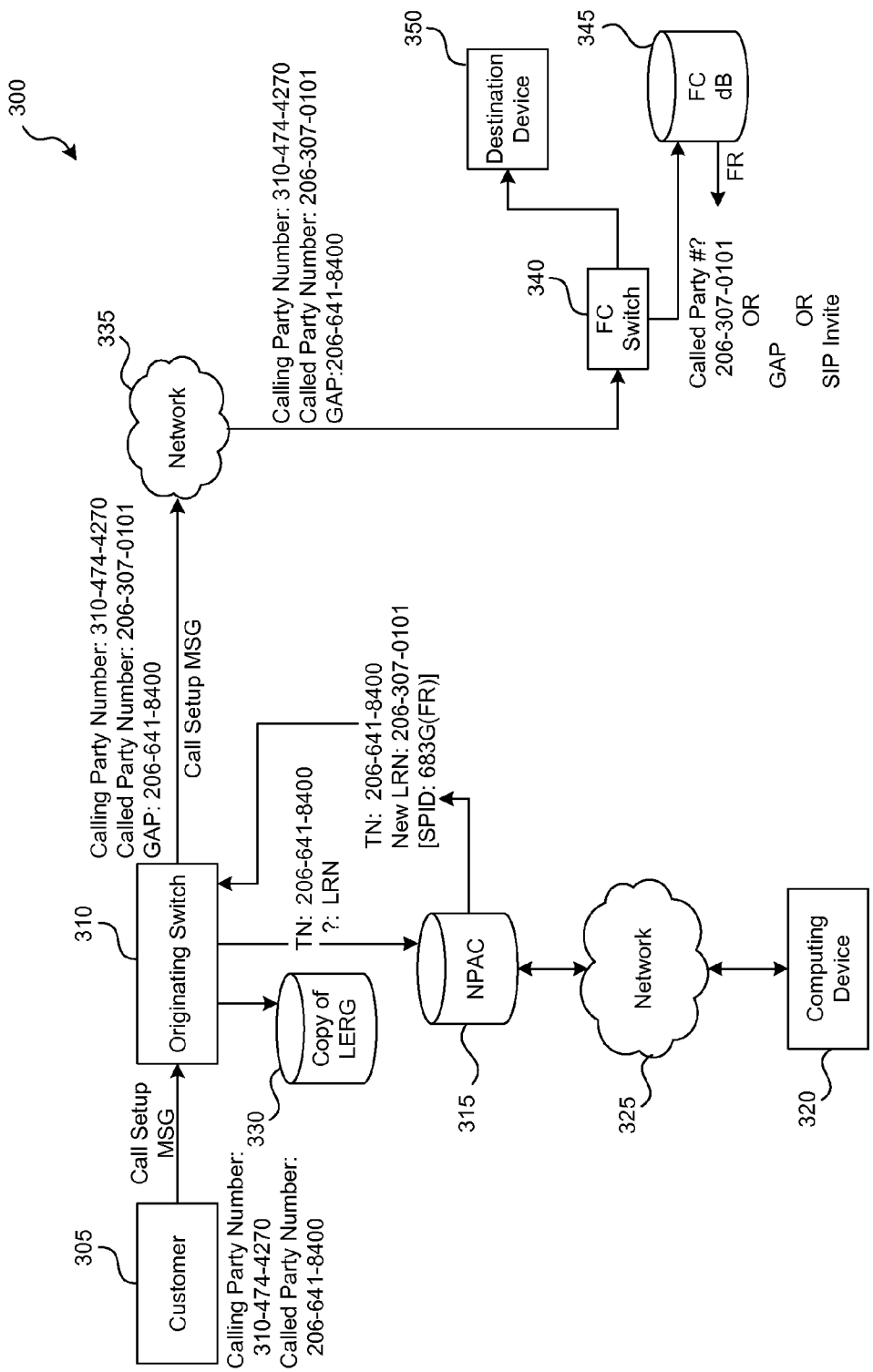
FIG. 3 illustrates an example of call routing according to one or more embodiments of the present invention.

FIG. 3 illustrates an example of call routing according to one or more embodiments of the present invention. As illustrated in FIG. 3, customer 305 makes a call from 310-474-4270 to 206-641-8400. An initial call setup message (e.g., SS7 IAM, SIP INVITE, etc.) is generated to inform originating switch 310 that a call needs to be established. Originating switch 310 queries the NPAC database 315 to obtain the LRN that is used to route the call. As mandated by various FCC and CRTC rules and orders, the NPAC is the telecom industry's common database used for routing calls for telephone numbers that are no longer assigned to an original NPA-NXX code holder (i.e., the telephone number has been ported to another carrier). The NPAC database consists of eight regional database across the US and Canada (i.e., Northeast, Mid-Atlantic, Southeast, Midwest, Southeast, Western, West Coast, and Canada). The NPAC database (or copies of the NPAC database) may be updated by various administrators using computing device 320 via network 325.

NPAC database 315 can return the LRN needed to route the call. NPAC database 315 does not have restrictions on the creation of an LRN for a service provider identifier (SPID) other than the LRN cannot already exist. A number under a certain SPID in the NPAC database (i.e., a service version record) can only be configured to use an LRN that is registered to that same SPID in the NPAC. In accordance with various embodiments, using write-access to the database, an LRN is created ("New LRN") in NPAC database 315 that is in any of the facilities carrier's native number blocks but is different than the LRN managed and/or used by the facilities carrier in the NPAC. Furthermore, entries (i.e., service version records) are created in the NPAC database 315 that will route calls to the New LRN. This allows the switch to route calls to underlying carriers without a dedicated circuit.

Originating switch 310 then also checks the local exchange routing guide (LERG) database 330 to retrieve data which can be used for routing the call. The LERG is a database that contains information on every telephone switch in the North American Numbering Plan and which native (i.e., not ported) phone numbers they cover; most telephone companies build their routing tables using the LERG database 330. The data stored within the LERG database 330 can include, for example, operating company numbers, company names, routing contacts, NPA information (i.e., Area Codes), destination codes (i.e., NPA NXX and Thousands-Blocks), switching entity record details, rate center details, and other information that can be used for routing calls.

In the example illustrated in FIG. 3, the New LRN entry returned from NPAC database 315 is 206-307-0101 and the SPID is 683G(FR). Originating switch 310 is used to send a call setup message to the network 335 (e.g., a PSTN, VoIP, or other network). The call setup message identifies the originating number from the calling device in the Calling Party Number field, includes the New LRN returned from NPAC database 315 in the Called Party Number field, and the generic address parameter (GAP) field includes the destination number. The original call setup includes a Called Party Number with the original dialed number (the virtual address).

Upon receiving and processing the call setup message, network 335 routes the message to switch 340, which handles the native number blocks from which the New LRN was assigned. Switch 340 can then query a database 345 to determine how the call should be completed (e.g., by using the called party number, GAP field contents, or SIP) to destination device 350. For example, in some embodiments, switch 340 can then route the call using a variety of infrastructure including plain old telephone system (POTS), VoIP, mobile infrastructure, and the like.

Figure 4:
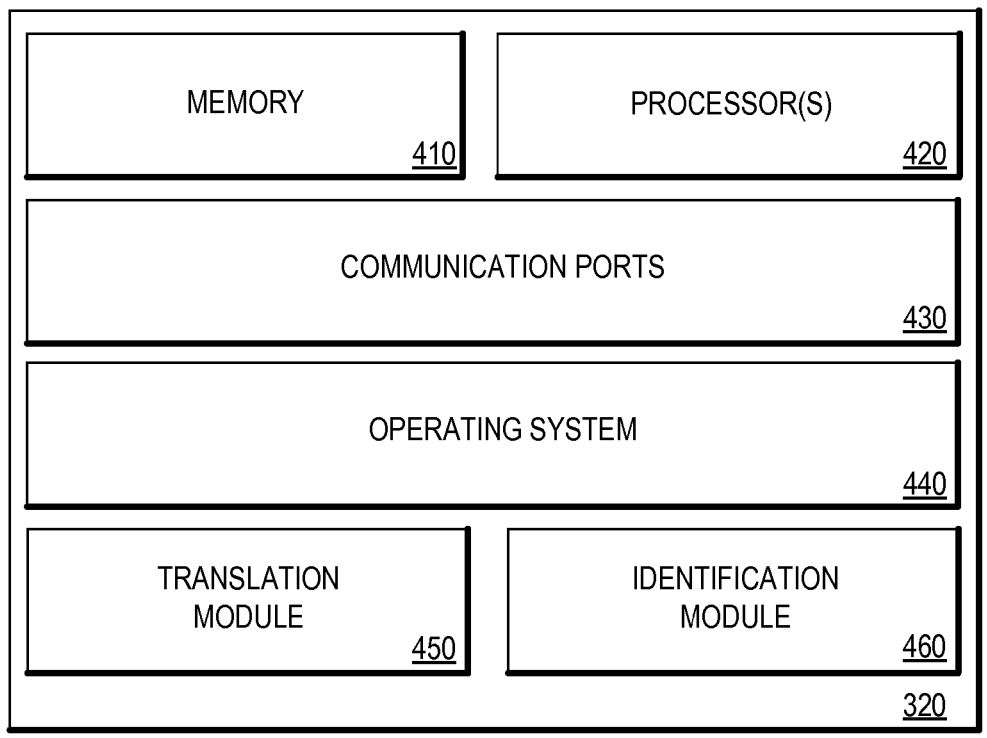
FIG. 4 is a block diagram illustrating a set of components in a switch according to some embodiments of the present invention.

FIG. 4 is a block diagram illustrating a set of components in switch 310 according to some embodiments of the present invention. According to the embodiments shown in FIG. 4, switch 310 can include memory 410, one or more processors 420, communication ports 430, operating system 440, translation module 450, and identification module 460. Other embodiments of the present invention may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, translation module 450 and identification module 460 can be combined into a single module for managing calls.

Memory 410 can be any device, mechanism, or populated data structure used for storing information. In accordance with some embodiments of the present invention, memory 410 can encompass any type of, but is not limited to, volatile memory, nonvolatile memory and dynamic memory. For example, memory 410 can be random access memory, memory storage devices, optical memory devices, media magnetic media, floppy disks, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, memory 410 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 410.

Memory 410 may be used to store instructions for running one or more applications or modules on processor(s) 420. For example, memory 410 could be used in one or more embodiments to house all or some of the instructions needed to execute the functionality of operating system 440, translation module 450, and/or identification module 460.

Processors 420 are the main processors of switch 310 and can provide the processing power to support software applications or modules, memory management, and multimedia. Processors 420 may be communicably coupled with memory 410 and configured to run operating system 440 and any applications stored on memory 410. Operating system 440 provides a software package that is capable of managing the hardware resources of switch 310. Operating system 440 can also provide common services for software applications or modules running on processors 420.

In accordance with some embodiments, translation module 450 can be used to generate a translated call setup message based on a New LRN. To generate the call setup message, translation module 450 can identify the originating number, a New LRN, and a destination number. The origination number and the destination number can be identified using the incoming call setup message. To identify the New LRN, for example, translation module 450 can access a routing database (e.g., NPAC database 315) and retrieve an entry with the New LRN. Translation module 450 can then generate the translated call setup message by placing the New LRN in a field for routing (e.g., the Called Party Number field) and the destination number in non-routing field (e.g., the GAP field).

Identification module 460 can monitor for calls to a number that has a service version record in the routing database with an LRN that is in a second carrier's native number block. For example, as a call message comes into the switch, identification module 460 can review the call message and identify call messages that meet these criteria. Once identified, identification module 460 can segment and/or tag messages generated by the switch. The segmentation and/or tagging can be used to prioritize messages, route messages, adjust billing rates, and the like. For example, in some embodiments, traffic can be segmented based on a routing number, generic address parameter, dialed number or the called party number.

Figure 5:
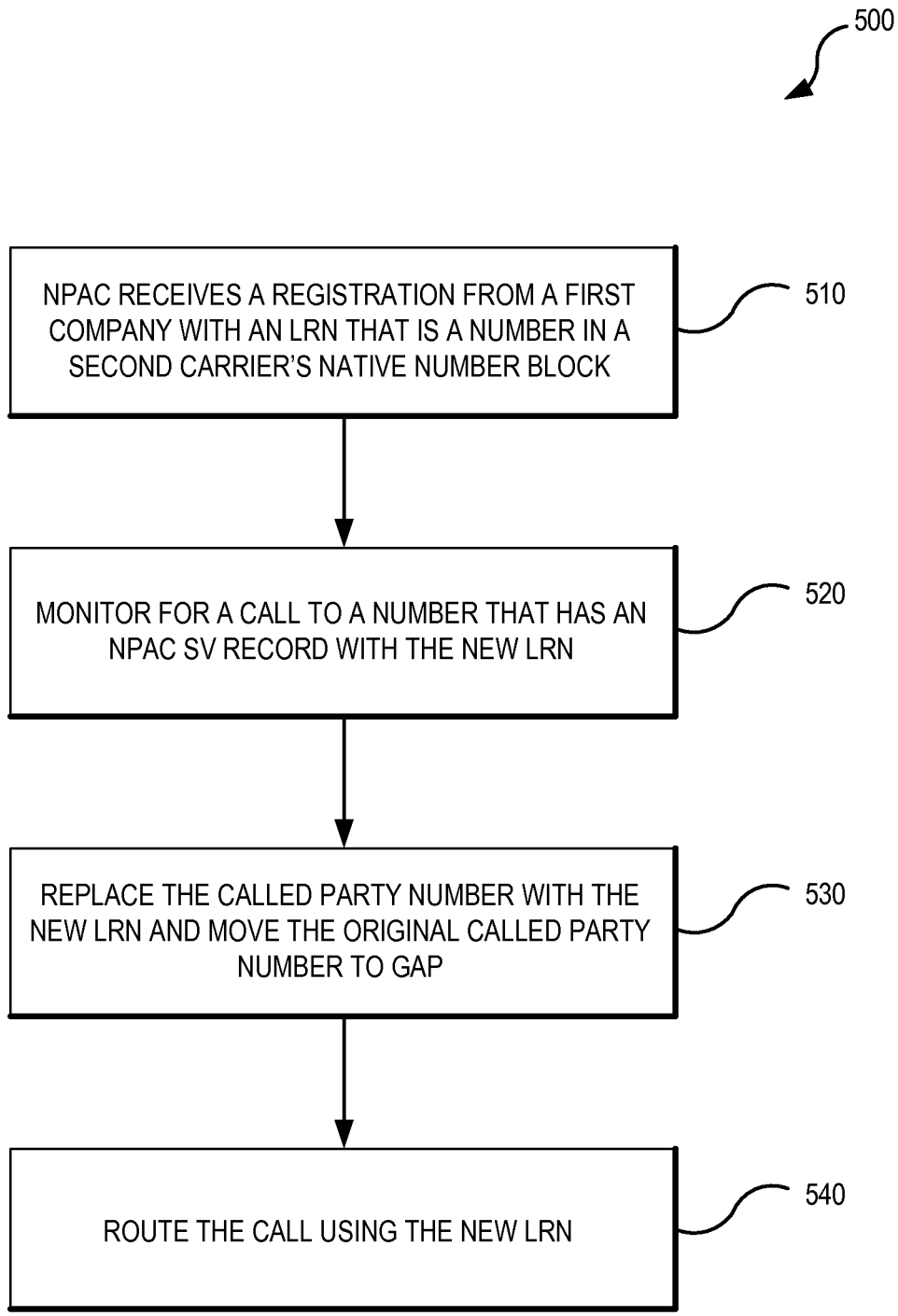
FIG. 5 is a flowchart illustrating a set of operations for creating and using a specialized routing service in accordance with various embodiments of the present invention.

FIG. 5 is a flowchart illustrating a set of operations 500 for creating and using a specialized routing service in accordance with some embodiments of the present invention. As illustrated in FIG. 5, registration operation 510 allows a first company to create an entry of a New LRN in the NPAC (or other routing) database from a second carrier's (e.g., a facilities carrier) native number block. Monitoring operation 520 then monitors for incoming traffic directed to the numbers that have NPAC entries (e.g., SV records) that use the New LRN. When incoming traffic is detected to that number, replacement operation 530 uses the New LRN assigned to the number in the NPAC database to create new routing messages. Routing operation 540 then routes the call through the network (e.g., a PSTN) to the second carrier's switch using the New LRN without the need for the company that created the NPAC entry to establish dedicated circuits and/or facilities.

Figure 6:
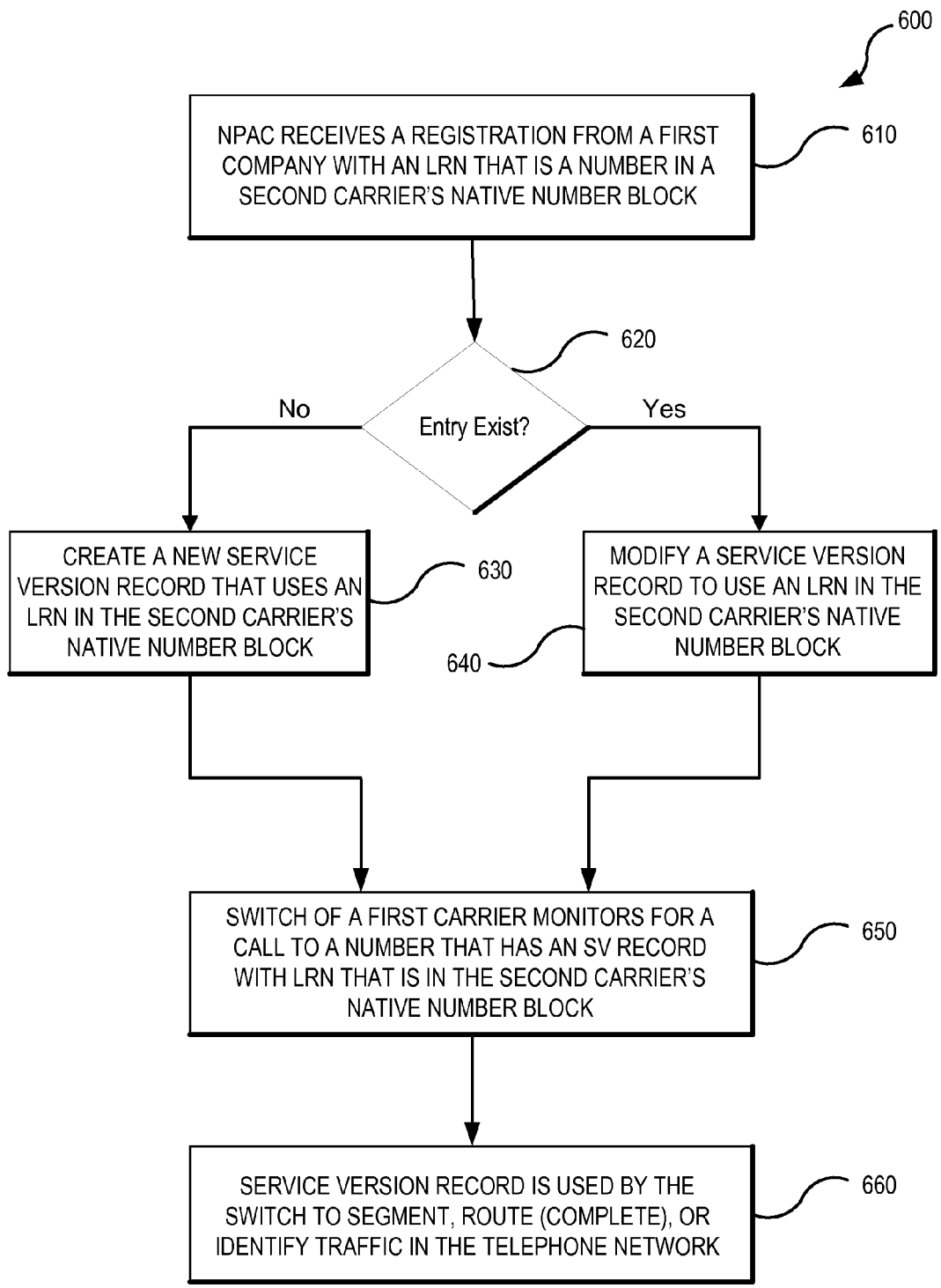
FIG. 6 is a flowchart illustrating a set of operations for creating and using service version records in accordance with one or more embodiments of the present invention.

FIG. 6 is a flowchart illustrating a set of operations 600 for creating and using service version records in accordance with one or more embodiments of the present invention. Service version records may include a variety of information including, but not limited to, telephone number, current assigned SPID, LRN, service provider name, previous service provider name, service provider type, billing identifiers, SS7 destination point codes, and other useful information. These service version records are stored as entries in a routing database (e.g., the NPAC database) which is available to carriers.

As illustrated in FIG. 6, a first operation—registration operation 610—receives a registration request from a first company to create an entry in the routing database (e.g., the NPAC database) with an LRN that is a number from a second carrier's (e.g., a facility carrier's) native number block. Determination operation 620 determines whether the entry in the routing database already exists. If determination operation 620 determines that the entry does not exist, then operation branches to perform creation operation 630, which creates a new service version record in the routing database. If determination operation 620 determines that the entry already exists, then operation branches to perform modification operation 640, which modifies an existing service version record to use the LRN that is a number in the second carrier's native number block. The service version entry can be viewed, created or modified using a variety of techniques such as through graphical user interfaces as illustrated in FIG. 7 and FIG. 8.

After the entry is created using creation operation 630 or modified using modification operation 640, monitoring operation 650 can then monitor for calls to the number that has the service version record with the LRN that is in the second carrier's native number block. For example, as a call comes into the switch, the switch can access entries in the routing database to identify such messages. Once identified, the service version record can be used by completion operation 660 to segment, route, or identify traffic in the telephone network.

Figure 7:
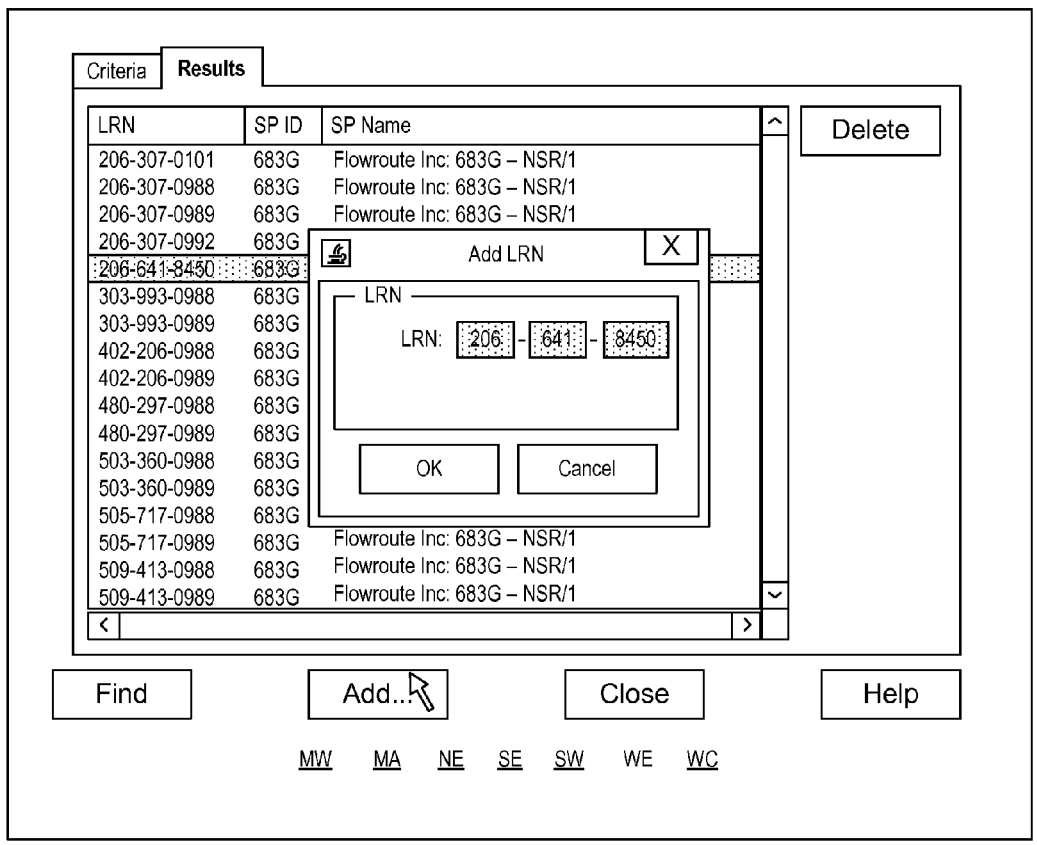
FIG. 7 is an example of a graphical user interface that may be used to add location routing numbers to a routing database in accordance with some embodiments of the present invention.
Figure 8:
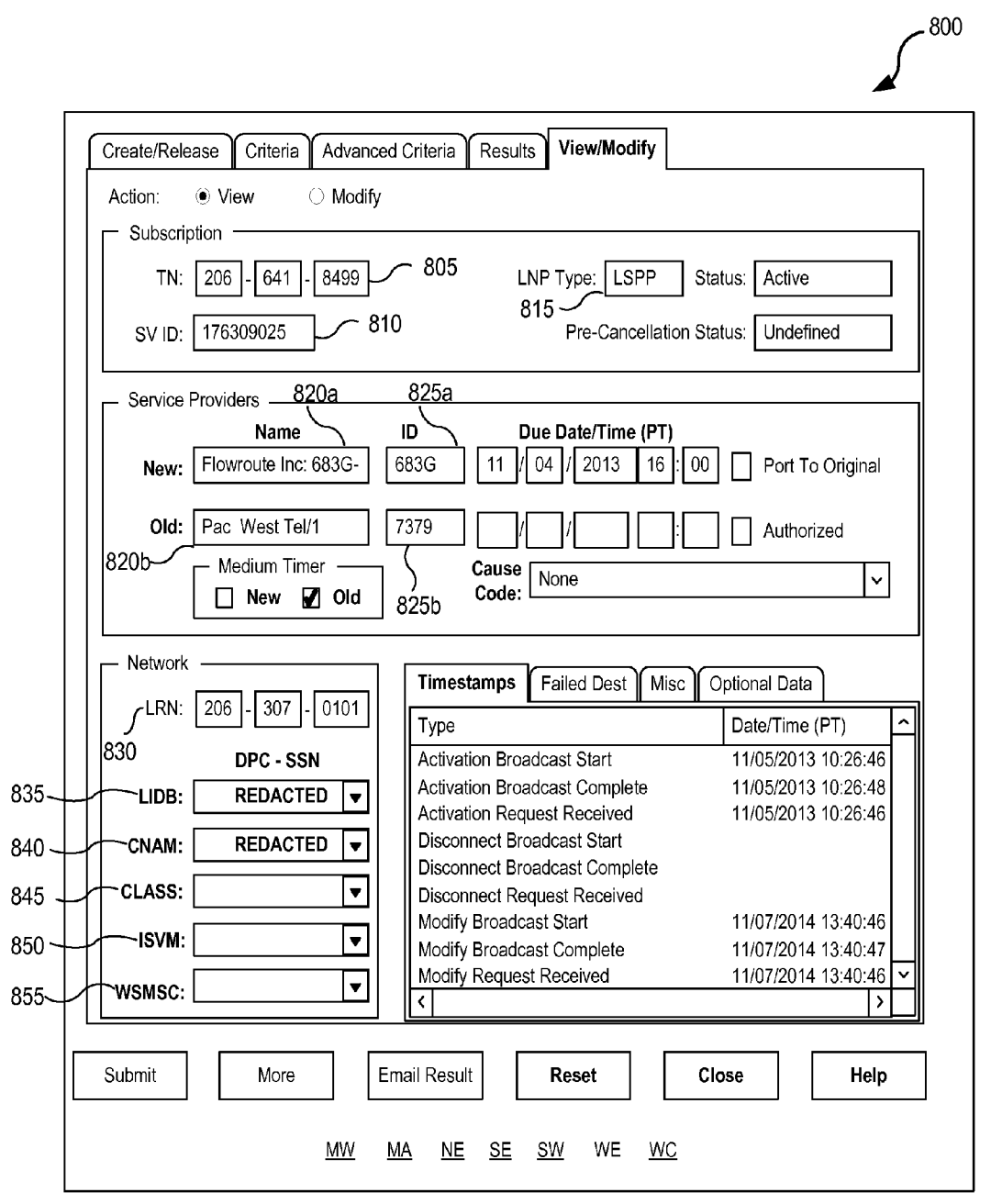

FIG. 7 is an example of a graphical user interface 700 that may be used to add location routing numbers to a routing database in accordance with some embodiments of the present invention. FIG. 8 is an example of a graphical user interface 800 illustrating an entry in a routing database in accordance with various embodiments of the present invention. As illustrated in FIG. 8, the service version entry can include multiple fields to identify subscription information, service provider information, and network information. Graphical user interface 800 can be used to view or modify entries in the database.

Subscription information can include telephone number field 805, service version identifier field 810 and LNP type field 815. Telephone number field 805 can be used to identify the telephone number. Service version identifier field 810 is a unique identifier of the database entry. LNP type field 815 can be used to classify porting activity into three types: 1) LSPP—inter-service provider port—a number that has been ported between two different SPIDs; 2) LISP—intra-service provider port—a number that has been ported within the same SPID; and 3) POOL—a number contained in a pooled thousand block.

Service provider information can include information about the new and old service provider. As illustrated in FIG. 8, service provider name fields 820a and 820b can be used to record the name of the new service provider following the completion of the porting process and the old service provider of record prior to the porting process. In addition, ID fields 825a and 825b can identify the service provider identification number for the new and old service provider.

Network information can include information about an associated LRN 830 and the Destination Point Code (DPC) and the Sub System Number (SSN). The DPC is an address of a device on the Common Channel Signaling (SS7) network. The DPCs, illustrated in FIG. 8, refer to address components such as the databases used in the provision of Collect/Third Party Billing and Calling Name Delivery services and central office switches, for which the address is needed to facilitate inter-switch voice mail system operation (used to route the Call Waiting indicator signal from the voice mail system to the called party's serving switch) and to accommodate Auto-Recall/Auto-Call Return services.

For example, the line information database (LIDB) field 835 can identify a database that allows a toll operator to determine whether a telephone number may be billed for a call (Collect or Third Number) by indicating whether the billed number is a public phone. The LIDB can also be used to indicate that a number will accept Collect calls. Caller ID with name (CNAM) field 840 identifies the CNAM database that can be used to provide caller ID with name information. Custom Local Area Signaling Services (CLASS) field 845 identifies a group of vertical service features such as Caller ID (calling number delivery), Calling Name delivery, and call filtering (either to accept or to reject calls from specified numbers). Inter-Switch Voice Mail (ISVM) field 850 can be used to identify a centralized voice mail system associated with the telephone number. Wireless Short Message Service Center (WSMSC) field 855 can be used to identify the network element responsible for short message service for this telephone number.

Figure 9:
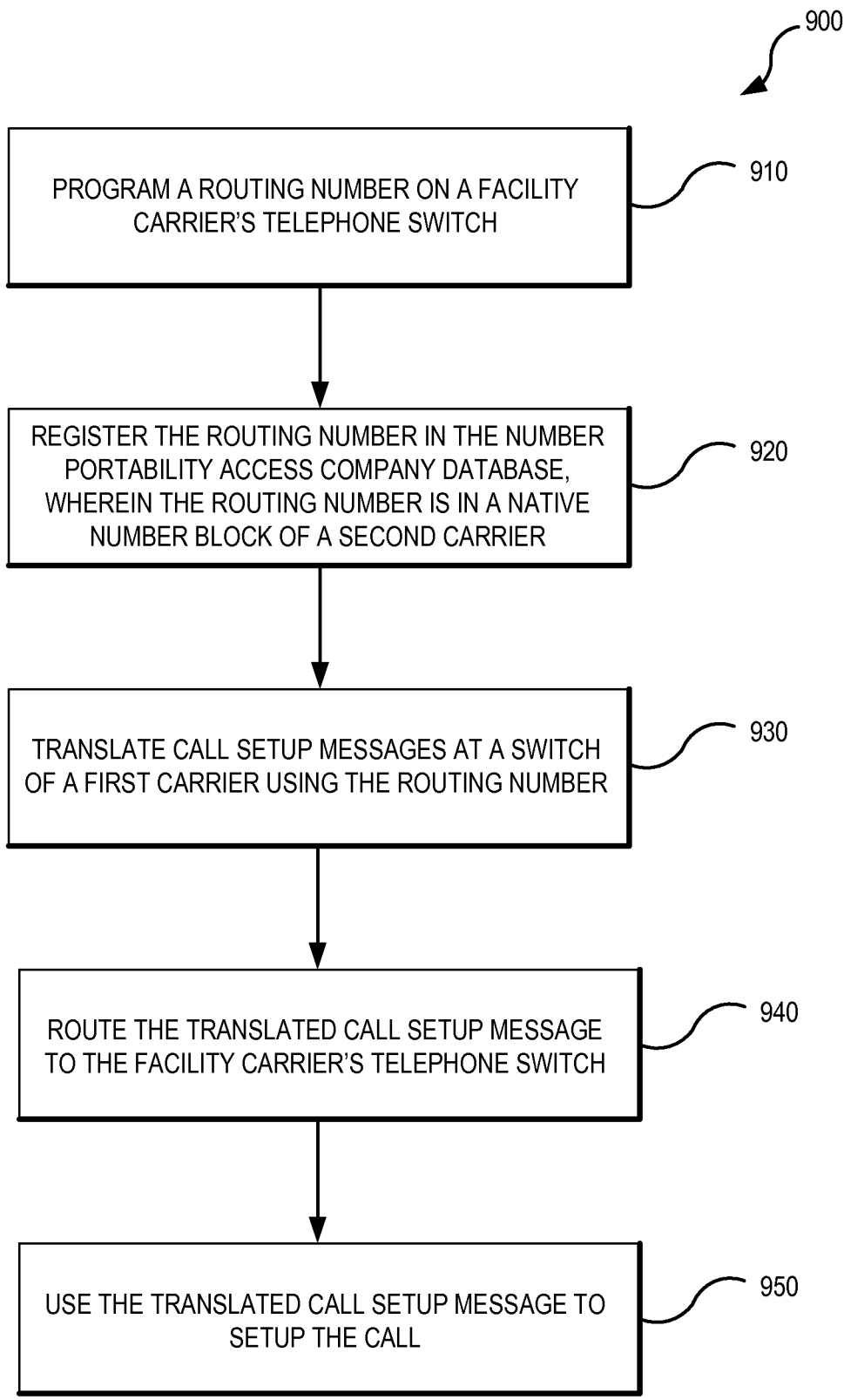
FIG. 9 is a flowchart illustrating a set of operations for generating a translated call setup message to route a call in accordance with one or more embodiments of the present invention.

FIG. 9 is a flowchart illustrating a set of overall operations 900 for generating a translated call setup message to route a call in accordance with one or more embodiments of the present invention. As illustrated in FIG. 9, programming operation 910 can be used to program a routing number on a facility carrier's telephone switch. In some embodiments, programming operation 910 may be switch dependent as there are various types of switches and/or routing software systems. In some embodiments, the provisioning may be done via a GUI, terminal or some other programmatic interface. The facility carrier's telephone switch may be programmed to accept traffic from all routing numbers or an identified set of routing numbers (e.g., one or more routing numbers). Registration operation 920 registers the routing number in the number portability access company database. Upon receiving a call at a switch of a first carrier, translation operation 930 can translate call setup messages using the routing number. Routing operation 940 then routes the translated call setup messages to the facility carrier's telephone switch where setup operation 950 uses the translated call setup messages to setup the call.

Figure 10:
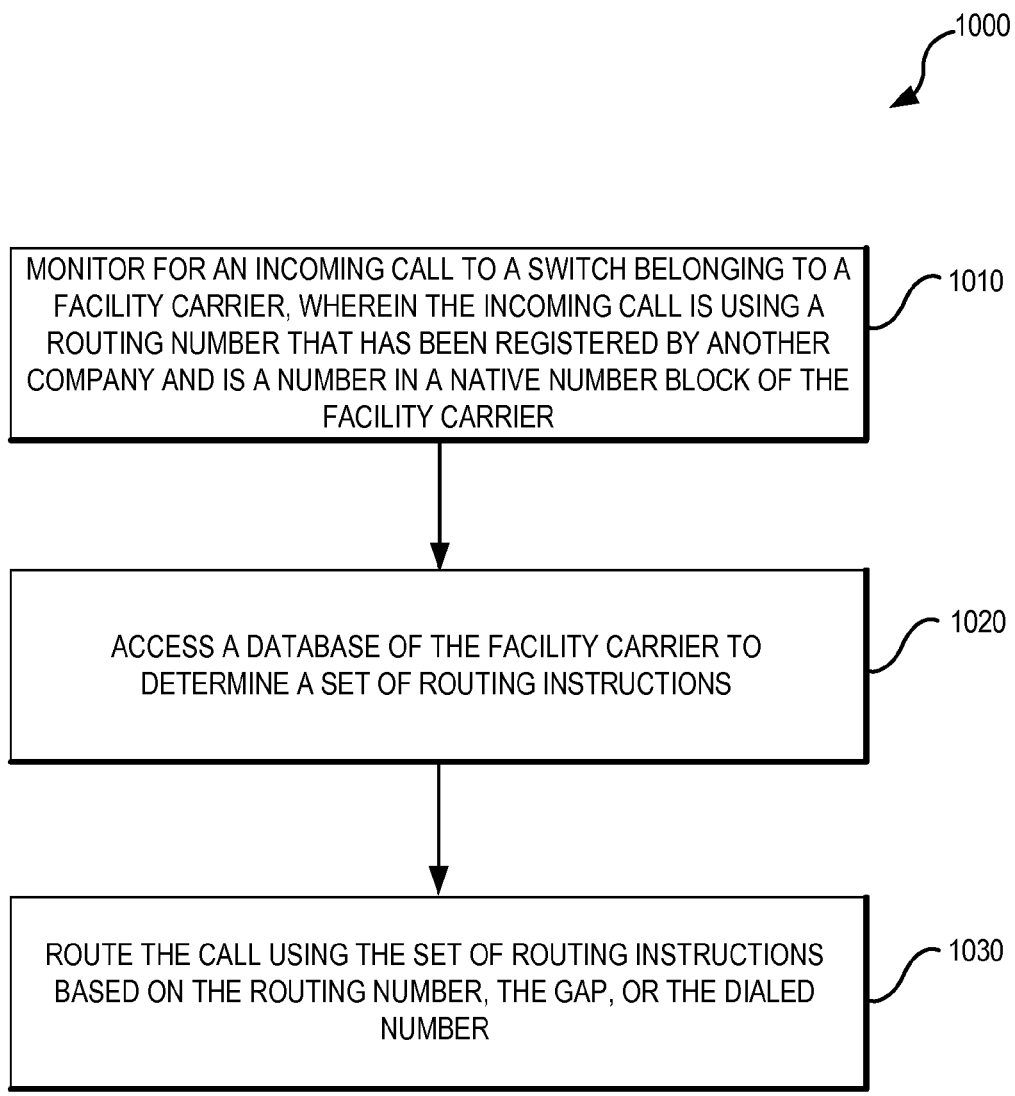
FIG. 10 is a flowchart illustrating a set of operations for operating a facilities carrier switch according to some embodiments of the present invention.

FIG. 10 is a flowchart illustrating a set of overall operations 1000 for operating a facilities carrier switch according to some embodiments of the present invention. As illustrated in FIG. 10, monitoring operation 1010 monitors for incoming calls to a switch belonging to the facilities carrier. The incoming call may be using a routing number that has been registered by another company and is a number in a native number block of the facilities carrier. Determination operation 1020 can access a database associated with the facilities carrier and determine a set of routing instructions. Using this information, routing operation 1030 can then route the call based on the routing number, the generic address parameter, or the dialed number.

Figure 11:
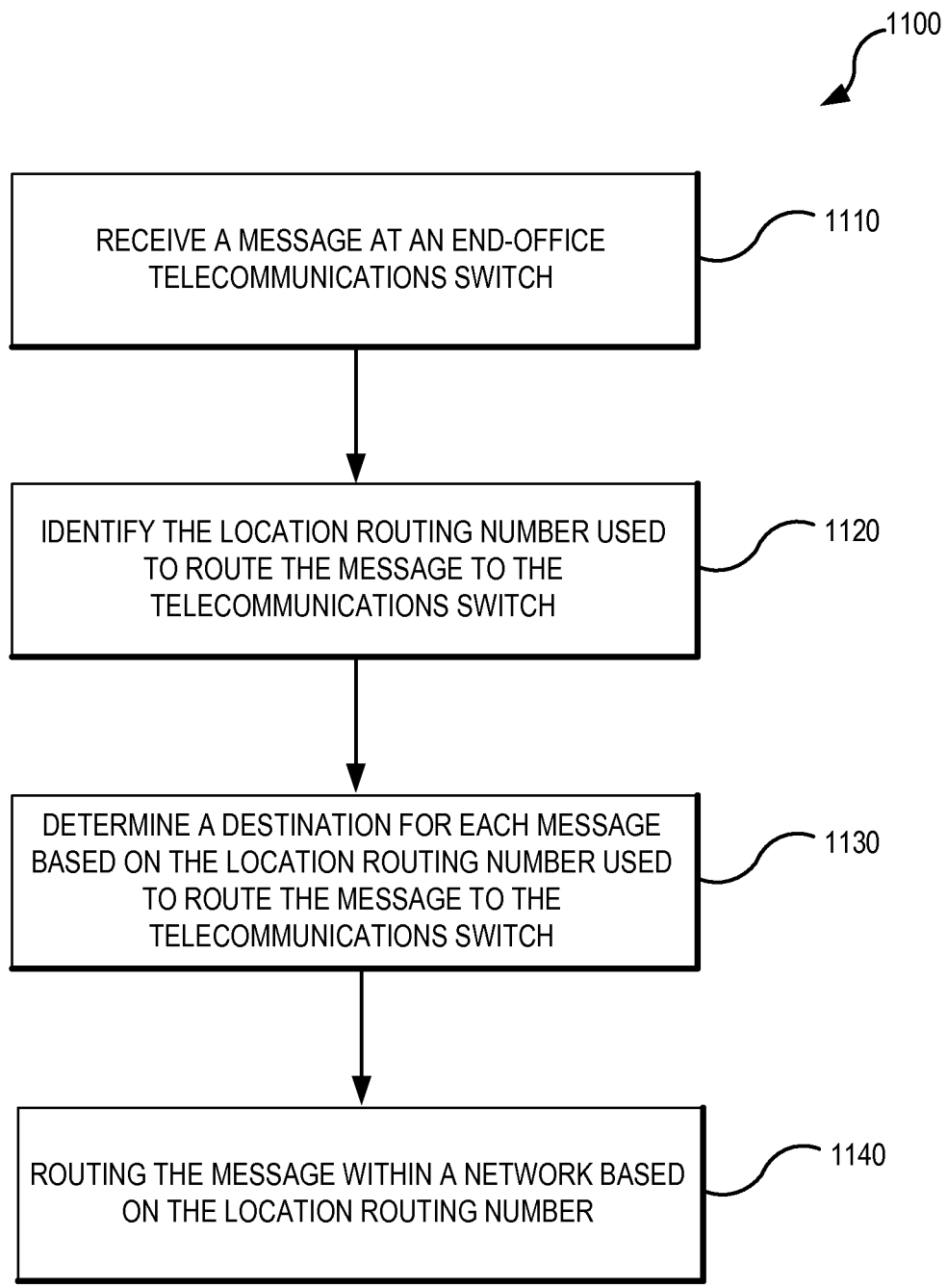
FIG. 11 is a flowchart illustrating a set of operations for routing messages received at a telecommunications switch based on a location routing number in accordance with various embodiments of the present invention.

FIG. 11 is a flowchart illustrating a set of operations 1100 for routing messages received at a telecommunications switch based on an LRN in accordance with various embodiments of the present invention. In some embodiments, the telecommunications switch may be an end-office switch. As illustrated in FIG. 11, receiving operation 1110 receives, at the telecommunications switch, messages directed to the telecommunications switch using LRNs. The LRN for each of the messages can be in a number block that is native to the telecommunications switch. In accordance with various embodiments, the telecommunications switch may be a class five switch, a TDM switch, or another type of switch. The telecommunications switch may be programmed to accept multiple LRNs (e.g., all LRNs, a range, or a specific set of LRNs).

Identification operation 1120 can identify the LRN associated with the message. For example, the LRN may be in a field (e.g., the destination field) or header associated with the message. As another example, the switch may query the NPAC to retrieve the LRN. Destination operation 1130 then determines a destination for each message based on the LRN used to route the message to the telecommunications switch. In accordance with some embodiments, destination operation 1130 can select a portion of the LRN (e.g., first six digits) associated with each of the received messages and then determine a destination for each of the messages based on the portion of the LRN associated with each of the messages. For example, destination operation 1130 may access a database having stored thereon routing entries indexed by portions of the LRNs.

Once a destination is determined, routing operation 1140 can route the message, from the telecommunications switch to the destination based on the LRN (e.g., within or outside of an office network). In some embodiments, the messages received at the telecommunications switch can be segmented based on the LRN. For example, when there are multiple LRNs associated with a telecommunications switch, the traffic can be segmented apart (or locally divided) for some purpose by using the LRN (or a portion of the LRN) as an identifier. The LRN (or portion of the LRN) can be used to segment for the purpose of routing, billing, normalization, monitoring, access controls, etc.) The segmentation can be event-triggered, scheduled, always occurring, or manually switched on and off in accordance with various embodiments.

Other NPAC fields could be included in the messages. These additional NPAC fields could be used to segment the traffic. While not shown in FIG. 11, an analytics operation may be used to generate various analytics based on the segmenting of the messages. Example of the various analytics that can be generated can include volumetric calculations, performance, quality, etc.

Illustrative embodiments of systems and methods for special call routing are described and set forth. This illustration is not intended to be exhaustive, but rather to additionally highlight some of the benefits and advantages associated with embodiments and features.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a computer-readable medium claim, other aspects may likewise be embodied as a computer-readable medium claim, or in other forms, such as being embodied in a means-plus-function claim. Any claims intended to be treated under 35 U.S.C. §112(f) will begin with the words "means for", but use of the term "for" in any other context is not intended to invoke treatment under 35 U.S.C. §112(f). Accordingly, the applicant reserves the right to pursue additional claims after filing this application to pursue such additional claim forms, in either this application or in a continuing application.

What is claimed is:

1. A method comprising:
   registering a location routing number in a number portability administration center database,
      wherein the location routing number is in a native number block of a facility carrier;
      wherein a company registering the location routing number in the number portability administration center database is not the facility carrier;
      wherein the company registering the location routing number in the number portability administration center database is a virtual network operator without an owned and leased dedicated physical facilities hardware switch connected to the telephone network for a call flow using the location routing number, and
      wherein a telephone number is added as a new entry of the number portability administration center database by:
         determining if an entry associated with the telephone number already exists in the number portability administration center database;
         creating, if the entry is determined to not exist, a new entry in the number portability administration center database for that telephone number using the location routing number; and
         modifying, if the entry is determined to already exist, an existing entry in the number portability administration center database using the location routing number; and
   directing a destination switch of the facility carrier to be programmed to accept traffic associated with the location routing number,
      wherein the traffic is generated by an originating telephone switch having access to the number portability administration center database.

2. The method of claim 1, wherein the destination switch is programmed to accept messages from any location routing number or a set of location routing numbers that includes the location routing number.

3. The method of claim 1, wherein directing the destination switch to be programmed includes directing the facility carrier to program the destination switch.

4. The method of claim 1, wherein the number portability administration center database is communicably coupled to the originating telephone switch and the method further comprising:
   receiving, at the originating telephone switch, a request to connect to a destination number; and
   generating, at the originating telephone switch, a call setup message having a calling party field populated with a calling party number, a called party field populated with the location routing number retrieved from the number portability administration center database, and a generic address parameter field populated with the destination number.

5. The method of claim 1, wherein the location routing number is not routable and wherein the destination switch is programmed to ignore messages associated with location routing numbers that are not routable.

6. The method of claim 5, wherein text messages, multimedia messages, and other non-voice service messages are routed to the destination switch using the location routing numbers that are not routable.

7. A method comprising:
   registering a location routing number in a number portability administration center database,
      wherein the location routing number is in a native number block of a facility carrier;
      wherein a company registering the location routing number in the number portability administration center database is not the facility carrier;
      wherein the company registering the location routing number in the number portability administration center database is a virtual network operator without an own and leased dedicated physical facilities hardware switch connected to the telephone network that accepts traffic using the location routing number; and
      wherein the location routing number is entered into a service version record of the number portability administration center database by:
         determining if an entry associated with the location routing number already exists in the number portability administration center database;
         creating, if the entry is determined to not exist, a new entry in the number portability database that includes the location routing number; and
         modifying, if the entry is determined to already exist, an existing entry using the location routing number; and
   directing a destination switch of the facility carrier to be programmed to accept traffic associated with the location routing number,
      wherein the traffic is generated by an originating telephone switch having access to the number portability administration center database.

8. The method of claim 7, wherein each service version record is active or inactive.

9. The method of claim 7, wherein the destination switch is programmed to accept messages from any location routing number or a set of location routing numbers that includes the location routing number.

10. The method of claim 7, wherein the number portability administration center database is communicably coupled to the originating telephone switch and the method further comprising:
   receiving, at the originating telephone switch, a request to connect to a destination number; and
   generating, at the originating telephone switch, a call setup message having a calling party field populated with a calling party number, a called party field populated with the location routing number retrieved from the number portability administration center database, and a generic address parameter field populated with the destination number.

11. The method of claim 7, wherein the location routing number is not routable and wherein the destination switch is programmed to ignore messages received using the location routing number that is not routable.

12. The method of claim 11, wherein text messages, multimedia messages, and other non-voice service messages are routed to the switch using the location routing number that is not routable.

13. A non-transitory computer-readable medium having instructions that when executed by one or more processors cause a machine to:
   register a location routing number in one or more number portability access company databases,
      wherein the location routing number is in a native number block of a facility carrier;
      wherein a company registering the location routing number in the one or more number portability administration center databases is not the facility carrier;
      wherein the company registering the location routing number in the number portability administration center database is a virtual network operator without an own and leased dedicated physical facilities hardware switch connected to the telephone network that accepts traffic using the location routing number; and
      wherein the location routing number is entered into a service version record of the number portability database by:
         determining if an active entry associated with the location routing number already exists in the number portability database;
         creating, if the active entry is determined to not exist, a new active entry in the number portability database that includes the location routing number; and
         modifying, if the active entry is determined to already exist, the active entry using the location routing number, and
   direct a destination switch of the facility carrier to be programmed to accept traffic associated with the location routing number,
      wherein the traffic is generated by an originating telephone switch having access to the number portability administration center database.

14. The non-transitory computer-readable medium of claim 13, wherein the destination switch is programmed to accept messages from any location routing number or a set of location routing numbers that includes the location routing number.

15. The non-transitory computer-readable medium of claim 13, wherein the location routing number is not routable and is used to direct non-voice service messages to the destination switch.

* * * * *